United States Patent Office.

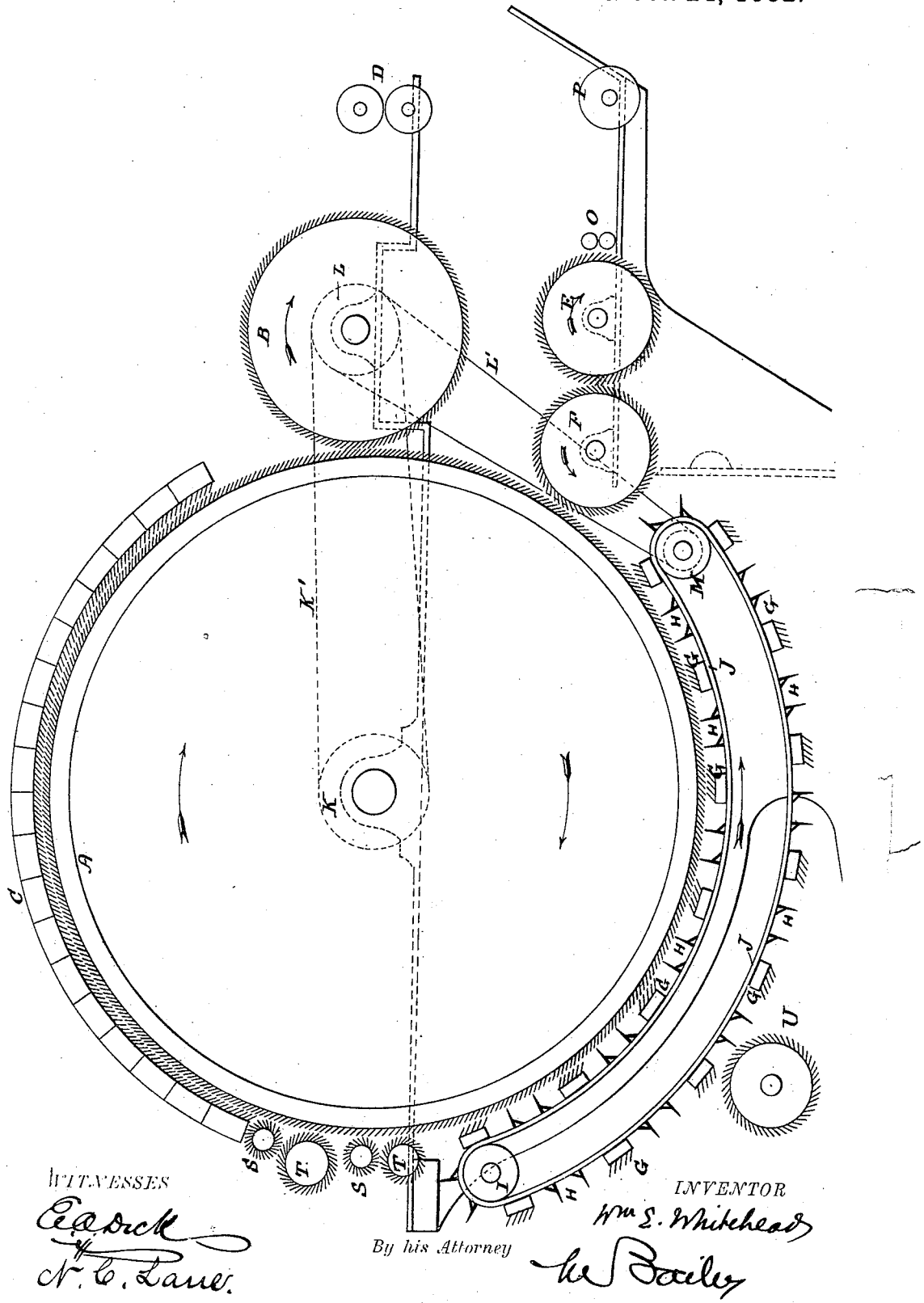

WILLIAM E. WHITEHEAD, OF MILES PLATTIN, ENGLAND, ASSIGNOR TO THE WHITEHEAD & ATHERTON MACHINE COMPANY, OF LOWELL, MASS.

CARDING-MACHINE.

SPECIFICATION forming part of Letters Patent No. 266,334, dated October 24, 1882.

Application filed May 7, 1881. (No model.)

*To all whom it may concern:*

Be it known that I, WILLIAM E. WHITEHEAD, of Miles Plattin, England, temporarily residing in Tewksbury, State of Massachusetts, have invented certain new and useful Improvements in Carding-Machines, of which the following is a specification.

The object I have in view in these improvements is to better and more thoroughly clean and card cotton of various grades, and also to provide for the removal from the flats and buckets of foreign substances which by the latter have been taken or removed from the carding-cylinder. I use for this purpose, in combination with the carding-cylinder and top-flats, placed above the axis of the cylinder, traveling flats or buckets, or both combined, placed below the axis of the cylinder, employing a suitable stripper for the purpose of cleaning out the traveling flats. I also, in some cases, prefer to combine with these elements rollers and clearers placed, like the top-flats, above the axis of the carding-cylinder. The cotton delivered by the "lickers-in" to the carding-cylinder passes successively the under flats or buckets, or both combined, the rollers and clearers, and the top-flats, before reaching the doffer, and by the action of these instrumentalities is very thoroughly cleaned and carded.

The nature of my invention and the manner in which the same is or may be carried into effect can best be explained and understood by reference to the accompanying drawing, which is a side elevation, partly in section, of so much of a carding-machine as required to illustrate my improvements.

A is the carding-cylinder, supported, together with the other working parts of the machine, in a frame of proper construction. B is the doffer, which takes the sliver of carded cotton from the cylinder; and D are the delivery-rolls which receive the cotton from the doffer. The carding-cylinder is provided with top-flats C, placed above the axis of the cylinder, and arranged to operate in connection therewith in the usual way. Cotton is delivered to the carding-cylinder by lickers-in E F, which take the cotton drawn from the lap P by feed-rolls O.

Below the carding-cylinder are the traveling flats G and buckets H, hereinbefore referred to, which, as indicated by the arrows, move in a direction opposite to that in which the cylinder moves. They are in this instance carried by an endless power-driven apron, J, the flats alternating with the buckets in the arrangement shown in the drawing. It will, however, be understood that either flats or buckets may be used alone, if desired. The apron is mounted on rollers I M, which serve to keep the flats and buckets in their right position relatively to the carding-cylinder, in connection with which they operate. The buckets serve to remove from the cylinder a portion of the foreign matter removed by the latter from the cotton, and as they revolve and pass down on the under side of the endless apron or carrier they discharge the dirt thus gathered and come up again in position to act on the cylinder. When the traveling flats G are used, either alone or in conjunction with the buckets, I employ a revolving stripper-cylinder, U, which cleans the traveling flats, and should itself be cleaned or "stripped" by a suitable stripper, (not shown,) to which motion may be given by any of the well-known devices commonly attached to carding-machines. One or both of the rollers I M (which of course move at the same peripheral speed) may be power-driven. In this case roller M is power-driven, obtaining motion from a pulley, L, on the doffer-cylinder by means of a belt, L', leading from pulley L to a pulley on the roller. The doffer-cylinder is driven from pulley K on the axle or shaft of cylinder A by a belt, K'. The endless apron is preferably geared to the roller by sprocket-wheel and chain, or equivalent connection, which will cause positive movement to be imparted from the roller to the apron. In case the two rollers are power-driven a similar connection should be had between each roller and the apron.

Intermediate between the top-flats and the traveling flats and buckets, and above a horizontal plane passing through the axis of the carding-cylinder, are rollers and clearers S T, which operate, in connection with the cylinder, in the usual way. The cotton delivered by the lickers-in to the carding-cylinder passes in succession the traveling flats and buckets, the rollers and clearers, and the top-flats before reaching the doffer, and is thereby very thoroughly cleaned and carded before being removed from the cylinder.

I remark that in some cases the rollers and clearers may be used to advantage with stationary instead of traveling flats or buckets, or both combined, placed below the axis of the carding-cyinder, this depending upon the kind of cotton operated on. In fact, there are many different grades of cotton in use, and it may be advantageous to use in combination all or a portion only of the active instrumentalities or members hereinbefore specified, according to the particular kind or grade of cotton to be operated on by the machine.

By the use of the traveling under-flats I am enabled to about double the capacity of the machine. They take up all the grosser impurities which would impede and interfere with the action of the top-flats, and are themselves kept constantly clean by the stripper or equivalent cleaning device, so as to present at all times to the carding-cylinder toothed surfaces in proper condition. They also act, in a measure, to preliminarily card the stock on the cylinder before it reaches and is acted on by the top-flats.

Having described my improvements, what I claim, and desire to secure by Letters Patent, is—

1. The combination of the carding-cylinder, the top-flats, under-flats mounted on or forming part of a power-driven traveling endless apron placed below the axis of said cylinder, and a stripper for said under-flats, for joint operation as hereinbefore shown and described.

2. The combination, with the carding-cylinder and top-flats, of traveling buckets and flats combined, placed below the axis of said cylinder, substantially as hereinbefore set forth.

3. The combination, substantially as hereinbefore set forth, of the carding-cylinder, top-flats, rollers and clearers combined, arranged above the axis of said cylinder, and flats and buckets combined, arranged below the axis of said cylinder.

4. The combination of the lickers-in, the carding-cylinder, the traveling buckets and flats, the rollers and clearers, the top-flats, and the doffer, under the arrangement and for operation substantially as hereinbefore set forth.

In testimony whereof I have hereunto set my hand this 2d day of May, 1881.

WILLIAM ED WHITEHEAD.

Witnesses:
 JOSEPH A. CORAM,
 JOSEPH Y. BRADBURY.